United States Patent
Orzell et al.

(10) Patent No.: US 7,286,889 B1
(45) Date of Patent: Oct. 23, 2007

(54) METHOD FOR RESOURCE ALLOCATION AND RE-GROUPING RECOGNIZING COMPETING PRIORITIES WHICH VARY BY DATE

(75) Inventors: Robert A. Orzell, Essex Junction, VT (US); Shivakumar P. Patil, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/278,821

(22) Filed: Apr. 6, 2006

(51) Int. Cl.
  *G06F 19/00* (2006.01)
(52) U.S. Cl. .......................... 700/101; 700/103; 705/8
(58) Field of Classification Search ........... 700/28, 700/99, 100, 101, 102, 103, 106, 107; 705/8, 705/28
  See application file for complete search history.

(56) References Cited

U.S. PATENT DOCUMENTS

| | | | |
|---|---|---|---|
| 5,751,580 A | * | 5/1998 | Chi .......................... 700/101 |
| 5,971,585 A | | 10/1999 | Dangat et al. |
| 6,701,201 B2 | | 3/2004 | Hedge et al. |
| 2002/0198757 A1 | | 12/2002 | Hedge et al. |
| 2005/0171824 A1 | | 8/2005 | Denton et al. |
| 2005/0177465 A1 | | 8/2005 | Orzell et al. |

\* cited by examiner

*Primary Examiner*—Leo Picard
*Assistant Examiner*—Charles Kasenge
(74) *Attorney, Agent, or Firm*—Gibb & Rahman, LLC; Richard M. Kotulak, Esq.

(57) ABSTRACT

A method determines production starts in a manufacturing environment by inputting production starts. The method groups the production starts into production lots according to grouping rules and assigns start dates and associated priorities to each of the production lots based on business priorities. Each production start date of a production lot can have a different priority. The method sorts the production lots according to the associated priorities and the start dates. Then the method capacitates the production lots by iterating through the production lots to assign production capacity to the production lots in order of the associated priorities and the start dates.

4 Claims, 8 Drawing Sheets

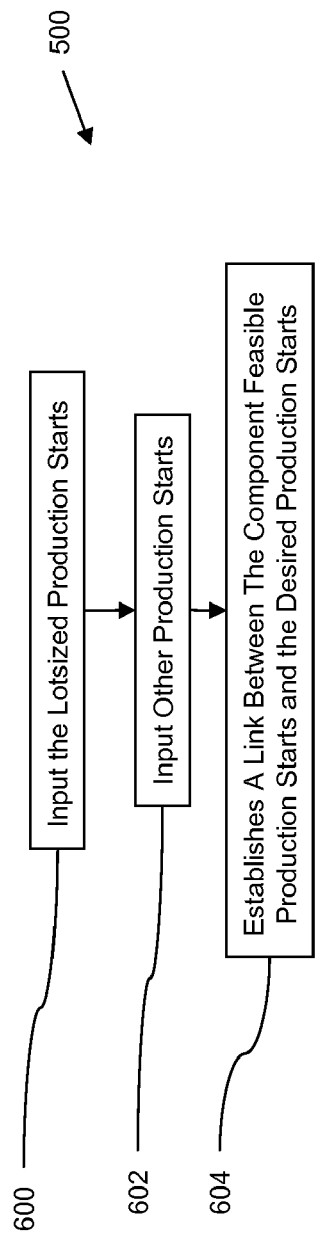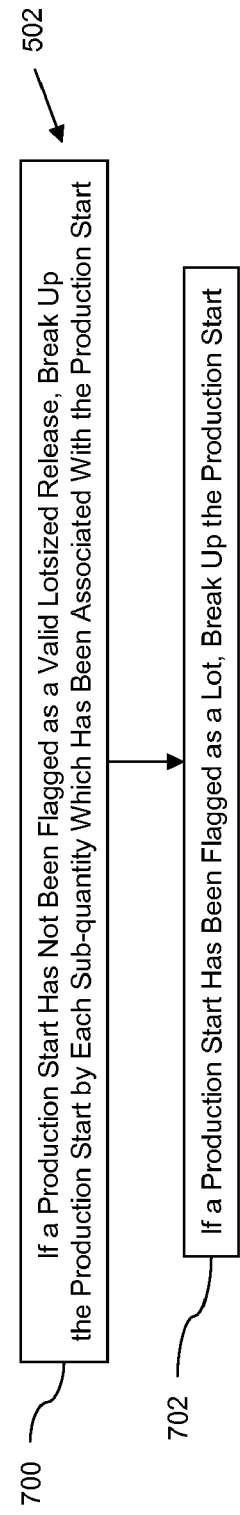

METHOD FOR RESOURCE ALLOCATION AND RE-GROUPING RECOGNIZING COMPETING PRIORITIES WHICH VARY BY DATE

The present application is related to pending U.S. patent application Ser. No. 11/278,817, filed concurrently herewith to Milne et al., entitled "Large Scale Supply Planning"; U.S. patent application Ser. No. 11/278,818, filed concurrently herewith to Robert Orzell, entitled "A Method For Calculating A Materials Requirements Plan For Demands Containing Multiple Demand Dates and Priorities"; and U.S. patent application Ser. No. 11/278,819, filed concurrently herewith to Degbotse at al., entitled "Supply Consumption Optimization and Multiple Component Utilization". The foregoing applications are assigned to the present assignee, and are all incorporated herein by reference

BACKGROUND OF THE INVENTION

1. Field of the Invention

The present invention relates to computer implementable decision support systems for resource allocation and for determining optimal supply chain plans based on multiple due date considerations. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advanced planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or heuristic algorithms.

The below-referenced U.S. Patents disclose embodiments that were satisfactory for the purposes for which they were intended. The disclosures of both the below-referenced prior U.S. Patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 6,701,201, "Decomposition System and Method for Solving a Large-Scale Semiconductor Production Planning Problem," Mar. 2, 2004; U.S. Patent Application 20050171824US1, "Method for simultaneously considering customer commit dates and customer request dates," Aug. 4, 2005; and U.S Patent Application 20020198757US1, "Method for allocating limited component supply and capacity to optimize production scheduling," Dec. 26, 2002.

SUMMARY OF INVENTION

The method disclosed herein determines production lots in a manufacturing environment by inputting production starts each having an initial recommended start date and quantity. The method groups the production starts into production lots according to grouping rules and additionally assigns multiple start dates with associated priorities to each of the production lots. Each production start date of a production lot can have a different priority. The method sorts the production lots according to the associated priorities and the start dates. Then the method capacitates the production lots by iterating through the production lots to assign production capacity to the production lots in order of the associated priorities and the start dates. This capacitation process assigns a capacity feasible production quantity to a currently iterated production start date, improves the capacity feasible production quantity calculated in subsequent iterations in response to lesser priorities associated with earlier dates, as possible, reduces a priority of assignment of production capacity in response to lower priorities associated with later dates, and repeats the iterating in order to find a best fit capacitation in response to a totality of priorities varying by date. Resulting valid production lots comply with the grouping rules. The method can split the production lots into multiple valid lotsized production lots. The iterating through the production lots begins with a production lot having a highest priority production start date and ends with a production lot having a lowest priority production start date.

When assigning the priorities, the method establishes a link between feasible production starts and desired production starts and the method can break up the modified lots into sub-quantities. The capacitating comprises assigning production capacity to the modified lots according to the priorities which vary by date. The capacitating also considers links to higher and lower priority start dates of each of the modified lots.

Thus, once valid sized production lots (having a plurality of production start dates, each having a different priority) are established, the method sorts the production start dates according to priority and date. Then the method can iterate through the production start dates to assign production capacity to the production start dates in order of the priority and date (beginning with highest priority and earliest production start date and ending with the lowest priority and latest production start date). When iterating, the method considers links to higher and lower priority start dates of each of the modified lots so that each production lot is not assigned duplicate production quantities, resulting in capacitated production starts best respecting the plurality of priorities and associated dates associated with the original uncapacitated input.

BRIEF DESCRIPTION OF THE DRAWINGS

FIG. 4 is a flow diagram illustrating a method of associating multiple priorities with a lot;

FIG. 5 is a flow diagram further illustrates a detail of FIG. 4;

FIG. 6 is a flow diagram illustrates another detail of FIG. 4;

DETAILED DESCRIPTION

Figure 1:
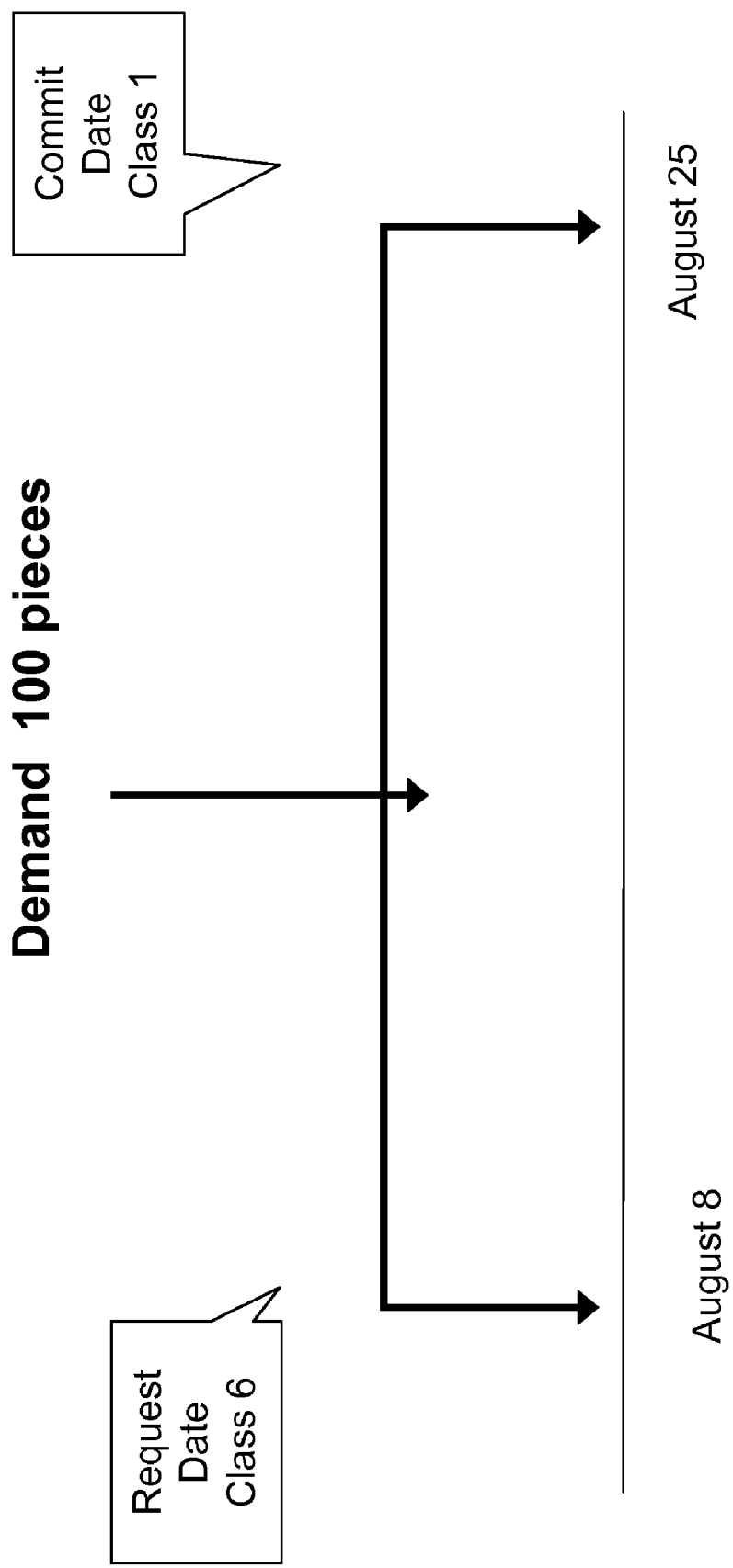
FIG. 1 is a schematic diagram showing an example of a demand with a request date and a commit date.

Supply chain planning involves the allocation of limited resources such as material inventories and capacities to best satisfy a prioritized demand statement. Competing needs for resources can be prioritized. However, the business priorities associated with a need can change as a function of when the need is satisfied. For example, FIG. 1 illustrates a demand for 100 pieces which has a requested delivery date of August $8^{th}$ and a committed delivery date of August $25^{th}$. In this example, previously the business committed to deliver the 100 pieces to the customer by August $25^{th}$ and presently the customer is requesting the pieces be delivered by August $8^{th}$. Because it is more important for the business to honor its previous commitment, the demand's commit date is assigned a more important priority (demand class 1) than the demand's request date (demand class 6). In general, a need may not be particularly important at the moment but may become critically important if the need is not met by a certain date (e.g. completing a project by a certain date required by government regulations). The converse is also true in that certain business needs may be critical to be satisfied by a certain date, but will lose value if the date is not met (e.g. being first to market). In fact, any given need for a supply may have multiple independent dates associated with it such that supplying the need by those dates would have different value (importance) to the enterprise and hence should be associated with different priorities which either increase or decrease in importance as a function of the delivery date. The invention described solves the problem of how to allocate limited capacities to needs (or demand) when priorities associated with the need change as a function of when the need is satisfied.

Given a pre-calculated set of a multitude of entities (products, services or tasks) which consume shared resources in their processing, there is often a need to re-group such entities (i.e., combine or divide the entities into acceptable units) and schedule such units for processing making appropriate use of constrained resources. This invention provides a method in which resource infeasible and potentially ungrouped entities can each be associated with priorities which vary by start date. The entities are re-grouped (i.e. combined and or divided) and altered by start date to conform with grouping rules such that constrained shared resources are not exceeded and resultant entities respect needs whose priorities change by date. The input entities and output entities of this invention can contain a multitude of different things (i.e., different part numbers or services) with the intent that the invention will resolve shared resources between the entities. For purposes of this method, a resource is defined under the assumption that it is "use-it-or-lose-it". That is, if a resource is not consumed on a given day, the unused portion cannot be accumulated for use the next day. This definition is consistent with resource consumption of machine utilization as well as use of human resources.

This invention can be applied to a variety of situations. While resource allocation is certainly a known art given the entities being resourced are associated with one priority, this method, which can provide a good solution to the problem of resource allocation where entities being resourced have priorities that vary by date and must simultaneously conform to grouping rules, presents itself with many potential uses.

For example, the invention is applicable to capacitation and lotsizing of manufacturing releases given input of required manufacturing production starts each having multiple recommended start dates associated with different priorities. In all manufacturing industries, releases (or production starts) are introduced into the manufacturing line for processing through a completion point. In many industries, such production starts are required to be lotsized for efficiency purposes. For example, such production starts may be required to contain quantities which are more than a stated minimum and less than a stated maximum. Furthermore, certain processes may require lots to be in multiples of a given number. In addition to a lotsizing requirement, production starts may need to be capacitated for planning purposes. By capacitation, it is meant that planned production starts need to be constrained so that resources required to support the start quantities are not exceeded. As capacitation may delay production starts, production starts need to be prioritized properly to maximize supply against prioritized needs before capacitation is done. This gets further complicated as a manufacturing plant may desire to associate a manufacturing start with priorities which vary by start date.

For example, it is often the case in long lead time industries that a customer may be given a commit date that is later than what they requested based on projected supply when the order is taken. Later in time, it may be possible to supply closer to the customer's original request date as more supply may have become available. The business can automatically factor this into the resource allocation process by using this invention to make production starts to meet the customer's request date provided it does not impact other committed dates. This is done by associating a start with two or more dates, an earlier date corresponding to when the start would need to be made to make a customer's request date and a second later date with a higher priority indicating when the start would have to be made to meet the customer's commit date. With this information the method disclosed herein lotsizes and creates time capacity feasible manufacturing releases which attempt to meet customer request date, but not at the expense of missing commit dates. Conversely, it may be desirable to a business to prioritize such that a start can be driven with high priority if it can be started by a certain date but otherwise have the priority reduced to a priority consistent with other planned starts. This corresponds to a possible business situation where a customer is willing to pay a premium if a delivery can be made by a given date but will not pay the premium if the date is missed. By associating a manufacturing release with an initial date with a high priority and later date with a lower priority, the method herein disclosed accomplishes the desired business objectives.

In general, this invention provides a method to calculate lotsized manufacturing releases such that the resultant releases will not exceed available resources required for the production starts and such that timings of such releases will reflect the multiple date effective priorities which can be associated with the originally non-lotsized and uncapacitated production starts used as input to the method.

The invention is also useful in providing services where late penalties are charged. An organization may provide services which are constrained by available resources (say people). Competing needs for these constrained services may develop. These needs may have priorities associated with them which vary by date. For example, the needs may have dates associated with them such as the "earliest that can be started" (earliest time the work can be done associated with the lowest priority); the "desired start date" (a date greater than "earliest that can be started" indicating a desired date with a higher priority than "earliest that can be started"); and the "critical date" (a date greater than "desired start date" associated with a high priority, say indicating a date after which penalties will be charged against the enterprise). This invention can be applied to schedule the services to appropriately fit the multiple priorities associated with the needs consuming these services. The grouping aspects of this invention further accommodate where services have certain minimum or maximum caps (e.g. minimum time billed in 1 hour increments, not to exceed 8 hours a day).

Given initial production starts or services which can be provided from any conventional method, this method will employ heuristics to group (e.g. lotsize) the production starts or services, if required, and move such production starts or services in time as prioritized by multiple dates associated with the production starts or services, each such date having different priorities. In this process, the invention converts initial production starts or services to those which conform to grouping rules; associates priorities and dates to grouped production starts or services to govern their priority for capacitation including providing for multiple dates and associated priorities to be associated with the production starts or services (prior solutions do not address the ability to associate priorities which vary by date with lotsized planned manufacturing releases or services); and creates capacitated lotsized production starts or services in conformance to the multiple dates and priorities associated with the lot (prior solutions do not address capacitating lotsized production starts or services according to priorities which vary by date).

Thus, this method is beneficial in that resource allocation (e.g. capacitation) will consider production starts or services having different priorities depending on start date. The invention also goes beyond previous solutions by simultaneously providing for valid grouping (e.g., lotsized production starts or services) in conjunction with the capacitation process. Consequently, even when priorities do not change, the present invention represents an improvement over the prior heuristic art as a better method for allocating limited capacities to lotsized production starts.

For simplification of illustration, the invention is described below in terms of manufacturing production starts which can be lotsized and capacitated. However, one ordinarily skilled in the art would understand that the method equally applies to services which may have certain minimum or maximum caps and which need to be scheduled so as not to exceed available resources. Hence the skilled practitioner can clearly see that "production starts" below can be replaced by any entity which consumes resources and "lotsize" below can refer to any grouping rules which impose minimums, maximums and multiple limitations on the grouping of the entities.

Figure 2:
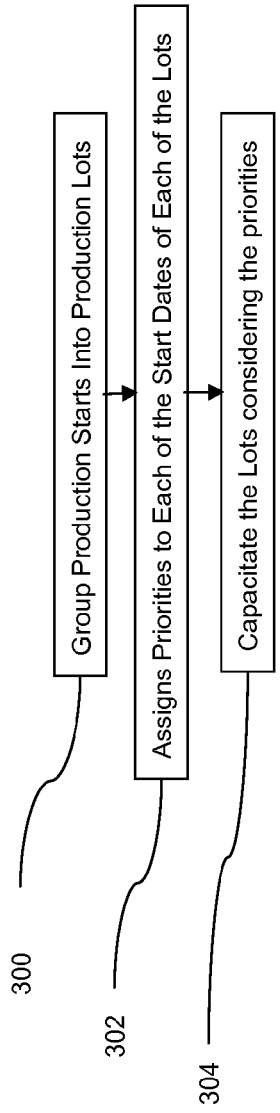
FIG. 2 is a flow diagram illustrating one embodiment of the invention.

As shown in FIG. 2, the invention employs fast heuristics to achieve the foregoing. More specifically, in item 300, the method initially groups the production starts into production lots (e.g., lotsizes the production starts) so that the production lots conform to given minimum, maximum and multiple lotsize rules. In item 302, the method assigns one or more priorities to the production lots of item 300, such priorities varying by date. By the actions of item 302, each production lot will be associated with multiple dates, each such date associated with a priority for capacitation purposes. In item 302, the lots may be split to more logically fit competing priorities provided a given lot can be split into two or more lots each of which conform to lotsize rules. Then, in item 304, the method capacitates each of the lots by calculating when the lots can be started without exceeding capacity based on the multiple dates and priorities associated with a lot. Again, in item 304, the lots can be split into two or more lots to most efficiently utilize capacity provided each of the split lots conform to the lotsize rules. Each of the above steps is described in more detail below.

Figure 3:
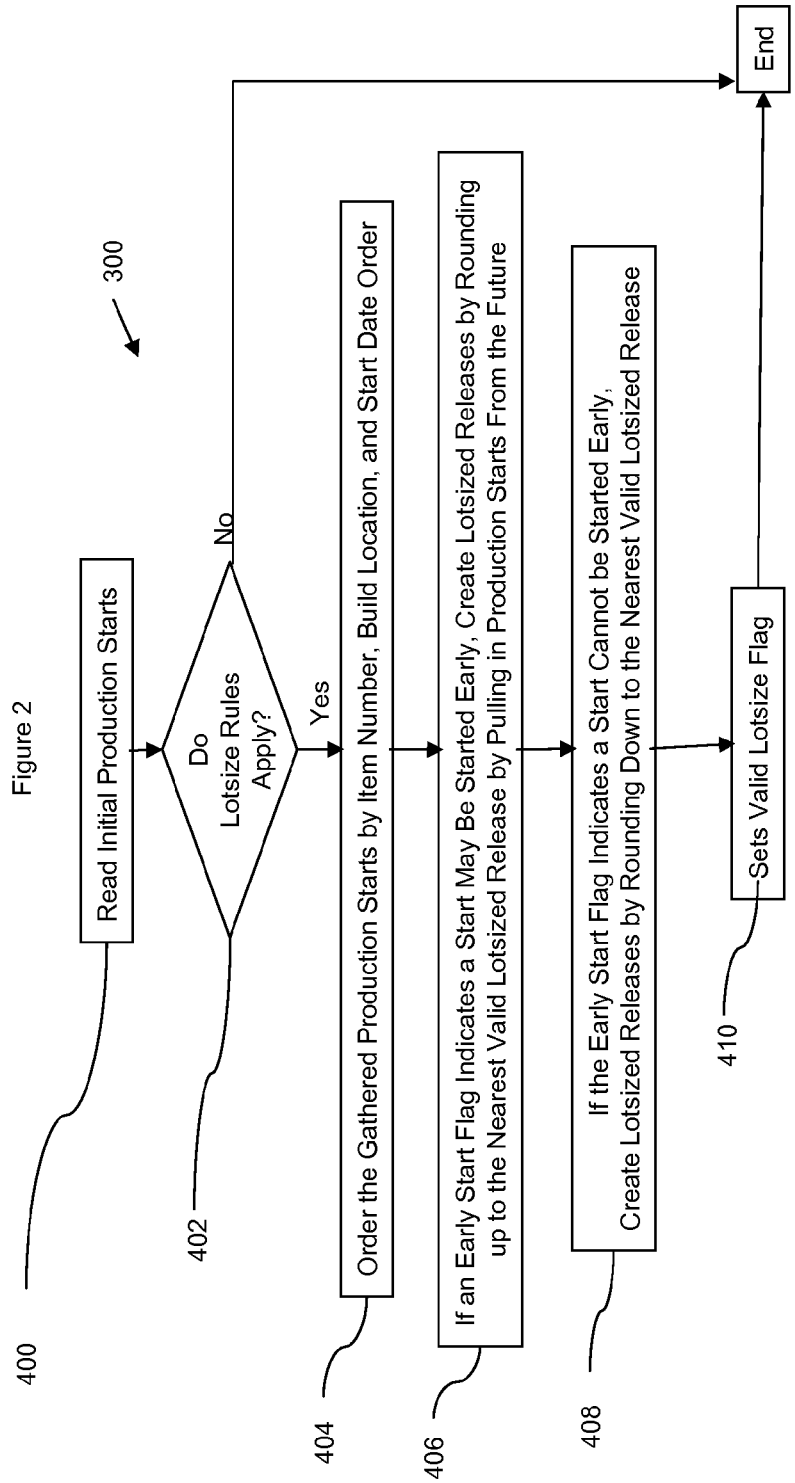
FIG. 3 is a flow diagram illustrating a method of grouping production starts into valid lotsizes.

FIG. 3 illustrates step 300 in greater detail. Initial production starts will be input. These production starts may not be lotsized and may be infeasible. Such production starts may come from a variety of sources. The simultaneously submitted related application "Supply Consumption Optimization and Multiple Component Utilization" BUR92006004US1 describes one method of calculating such production starts which can be used to create the initial production starts which form the input to this method. BUR920060004US1 defines a method of creating planned production starts based on component availability but the results of that method are neither lotsized nor adjusted to fit available capacity. Alternatively, the initial production starts used as input could also have been calculated from a traditional MRP system or as an intermediate step by any planning system. While these examples of how required inputs to this invention have been provided, this invention is not dependent on the source of the production starts or how they are calculated.

FIG. 3 illustrates that the method reads the initial production starts in item 400. Such production starts will contain a recommended start date when the production start may be made and a quantity. This start date may represent the earliest date a start can be made based on component availability or it may simply represent a desired start date. Initial production starts should have a flag indicating whether or not the capacitation process is allowed to start earlier than the date associated with the start. As an example of usage, production starts at the bottom of the bill of material supply chain may be started earlier to help relieve capacitation problems as they will not be dependent on the availability and timing of components. Production starts at mid-levels of the bill of material may not be able to start earlier than the date indicated as they will be constrained by component availability if the present invention is used in the context of an "implosion" of available assets.

In item 402, the method determines if lotsize rules apply to the production starts just read. If so, processing proceeds to apply the rules in item 404 below. Otherwise, if there are no rules to apply item 300 is complete and processing can proceed to item 302, as discussed above with respect to FIG. 2.

In item 404, the method processes (sorts, orders) the gathered production starts in item number, build location, and start date order, and item 404 outputs valid lotsized production starts.

If an early start flag indicates a start may be started early, the method creates lotsized releases by rounding up to the nearest valid lotsized release by pulling in production starts from the future as shown in item 406. If no production starts are available to pull in from the future to make a valid lotsized release, the method rounds up to the next valid lotsized release anyway.

| Example lotsizes must be in multiples of 25 | Production starts can be moved to start early | | | |
|---|---|---|---|---|
| Start date | 2/01 | 2/05 | 2/09 | 2/15 |
| Original production starts | 16 | 18 | 37 | 22 |
| Lotsized production starts | 25 | 25 | 25 | 25 |

If the early start flag indicates that a production start cannot be started early, the method creates lotsized releases by rounding down to the nearest valid lotsized release and pushing any remainder to the next production start as shown in item 408. The last start may not be convertible to a valid lotsized release. In this case, the method leaves the last start without a lot size (unlotsized).

| Example lotsizes must be in multiples of 25 | Production starts cannot be started early due to component availability | | | |
|---|---|---|---|---|
| Start date | 2/01 | 2/05 | 2/09 | 2/15 |
| Original production starts | 16 | 18 | 37 | 22 |
| Lotsized production starts | No start made | 25 | 25 | 25, 18 |

Finally, in item 410, this method sets a valid lotsize flag to indicate that the lots created by this process are valid lotsized releases. One exception occurs in the event the last production start could not be made into a valid lotsized release, in which case the valid lotsize flag is not set for the last production start.

FIG. 4 illustrates item 302 in greater detail which, as described above, assigns priorities and associated start dates to the lotsized releases, thereby splitting lots into finer lotsized releases to allow the inventive method to make better priority assignments. As previously described, the production starts calculated by the process shown in FIG. 3 have a recommended start date and quantity attached to them at the beginning, but have no priority information associated with them governing the sequence of capacity processing. In this processing shown in FIG. 4, the method associates a series of dates and associated priorities with the production starts indicating how the capacitation process is to proceed. By doing this, the method allows priority of capacitation to vary as a function of the start date of a production start. In order to illustrate the method, for clarity, the following demonstrates the case where each start can be associated with two dates having different priorities; however, the invention is not limited to just two dates and, instead, as would be understood by one ordinarily skilled in the art in light of this disclosure, there is no limit as to the number of start dates and due dates that can be associated with each production start or each demand. As such the method will use the term "pair" of dates and priorities below. The method is extendable to supporting any number of dates with associated priorities. As such, the word "n-tuple" may be substituted in any place below where "pairs" is used.

The processing of item 302 in FIG. 2 is illustrated in greater detail in FIG. 4. More specifically, in item 500, the method associates each lot with multiple n-tuples of start dates and priorities. The details occurring in item 500 are shown in greater detail in FIG. 5. This method is not dependent on any particular method for associating multiple n-tuples of dates and priorities with the lotsized releases. The method can accept any algorithm a business process may require to associate a lot with multiple n-tuples of dates and priorities. The result will be that any given lot can be associated with sub-lots, each sub-lot being associated with priorities which vary by start date such that the sum of the quantities of the sub-lots equal the quantity of its lot.

Example 1 below illustrates a method of associating such priorities useful in the situation where a planning engine is being fed component feasible (but not necessarily capacity feasible) production starts and the planning engine can also obtain true production starts needed to supply all demand and such production starts are associated with priorities which change by date. Thus, the example provides a method to prioritize inputted production starts to best satisfy the needs of the business by comparison against the true production starts needed to supply all demand, such true production starts each being associated with multiple dates and priorities, say representing priorities for making customers' desired dates versus priorities for making customers' commit dates.

Example 1 is a case where the invention can be used to support attempting to better supply to customers' desired dates but drives to customer commit dates with a higher priority. For a given item number, plant/warehouse, the method gathers in (inputs) the lotsized production starts from the processing shown in FIG. 5 above in item 600. Next, in item 602, the method gathers (inputs) production starts calculated from another method which identifies production starts required to meet all exit demands on-time. This differs from the production starts in FIG. 3 above in that the production starts from FIG. 5 may be delayed because of component availability problems in the supply chain. The production starts in item 602 reflect the needed production starts to meet all demands on time regardless of component availability or similar problems. These needed production starts also reflect priorities associated with multiple dates. The simultaneously submitted related patent application "A Method For Calculating A Materials Requirements Plan For Demands Containing Multiple Demand Dates and Priorities" BUR920060003US1, identifies a methodology for calculating needed production starts capable of associating multiple dates with multiple priorities with the needed production starts. However, the method of this disclosure would work with any method which can associate needed production starts with multiple dates and priorities.

Then, in item 604, the method establishes a link between the component feasible production starts of item 600 and the desired production starts of item 602. The simultaneously submitted related patent application entitled "Supply Consumption Optimization and Multiple Component Utilization" BUR92006004US1 describes a method which can be used to associate the component feasible production starts with the needed production starts. More specifically, in item 604, the invention applies the methodology described in the related patent application BUR920060004US1 treating the component feasible production starts as "supply" and the needed start as "demand" using the function of the related application which matches demands with available supply. The methodology will result in each component feasible lot being associated with one or more needed production starts together with their priorities which vary by date and use of the method in the related patent application guarantees a best fit.

The following tables illustrate a simplified example of the three above steps. Although the method can accommodate any number of dates, for clarity, the illustration below demonstrates the method using two dates which in this example will be called request date and commit date.

Item 600: read feasible lotsized production starts
(min = 25, max = 100, mult = 25)

| Quantity | Available Date | Flag |
|---|---|---|
| 100 | 03/01 | Cannot start early |
| 75 | 03/15 | Cannot start early |

Item 602: get needed production starts with associated priorities by date

| Quantity | Request Date | Request Priority | Commit Date | Commit Priority |
|---|---|---|---|---|
| 33 | 02/20 | 5 | 03/01 | 1 |
| 110 | 02/25 | 4 | 03/05 | 2 |
| 15 | 03/10 | 7 | 03/15 | 3 |
| 17 | 03/20 | 5 | 03/20 | 1 |

Item 604: associate each feasible lotsized release with multiple pairs of dates/priorities

| Quantity | Available Date | Flag | Sub-quantity | Request Date | Request Priority | Commit Date | Com Priority |
|---|---|---|---|---|---|---|---|
| 100 | 03/01 | Not early | 33 | 02/20 | 5 | 03/01 | 1 |
|  |  |  | 67 | 02/25 | 4 | 03/05 | 2 |
| 75 | 03/15 | Not early | 43 | 02/25 | 4 | 03/05 | 2 |
|  |  |  | 15 | 03/10 | 7 | 03/15 | 3 |
|  |  |  | 17 | 03/20 | 5 | 03/20 | 1 |

The above example demonstrates an embodiment of accomplishing item 604. above using related patent applications in using this invention where both available production starts (say based on component availability) are known and desired production starts (to meet all demand) are known. However, as stated earlier, any business method which allows lots to be broken into sub-lots each with multiple priorities which change by date may be used in this step.

As mentioned above, the processing of item 302 in FIG. 2 is illustrated in greater detail in FIG. 4. More specifically, in item 502, the method of item 302 splits lots into multiple valid lotsized releases, if needed and if possible, to better prioritize lots for the capacitation process in item. The process shown in item 502 is shown in greater detail in FIG. 6. At the start of this process, shown in FIG. 6, the method receives, as input, lotsized releases, broken down into sub-quantities each with their associated n-tuple of dates and priorities (from item 500). At the end of the process shown in FIG. 6, the method outputs valid lotsized releases each with a single valid lotsized quantity and a single n-tuple of dates/priorities associated with that valid lotsized quantity (to allow processing in item 304 to commence).

More specifically, in item 700, if a start has not been flagged as a valid lotsized release, the method breaks up the start by each sub-quantity which has been associated with the production start. To the contrary, in item 702, if a start has been flagged as a lot, the method will attempt to break up the start to provide better prioritized lots for the subsequent capacitation process. This is beneficial because, as in the case where lotsizing applies, resource allocation prioritization will be done based on priorities associated with a lot as opposed to individual subsets that make up the lot. With the inventive method only one n-tuple of dates and associated priorities can be associated with each lot. Also, if a lotsized release is split, all the resultant split lots are valid lotsized releases according to the governing lotsize (or grouping) rules.

Figure 7:
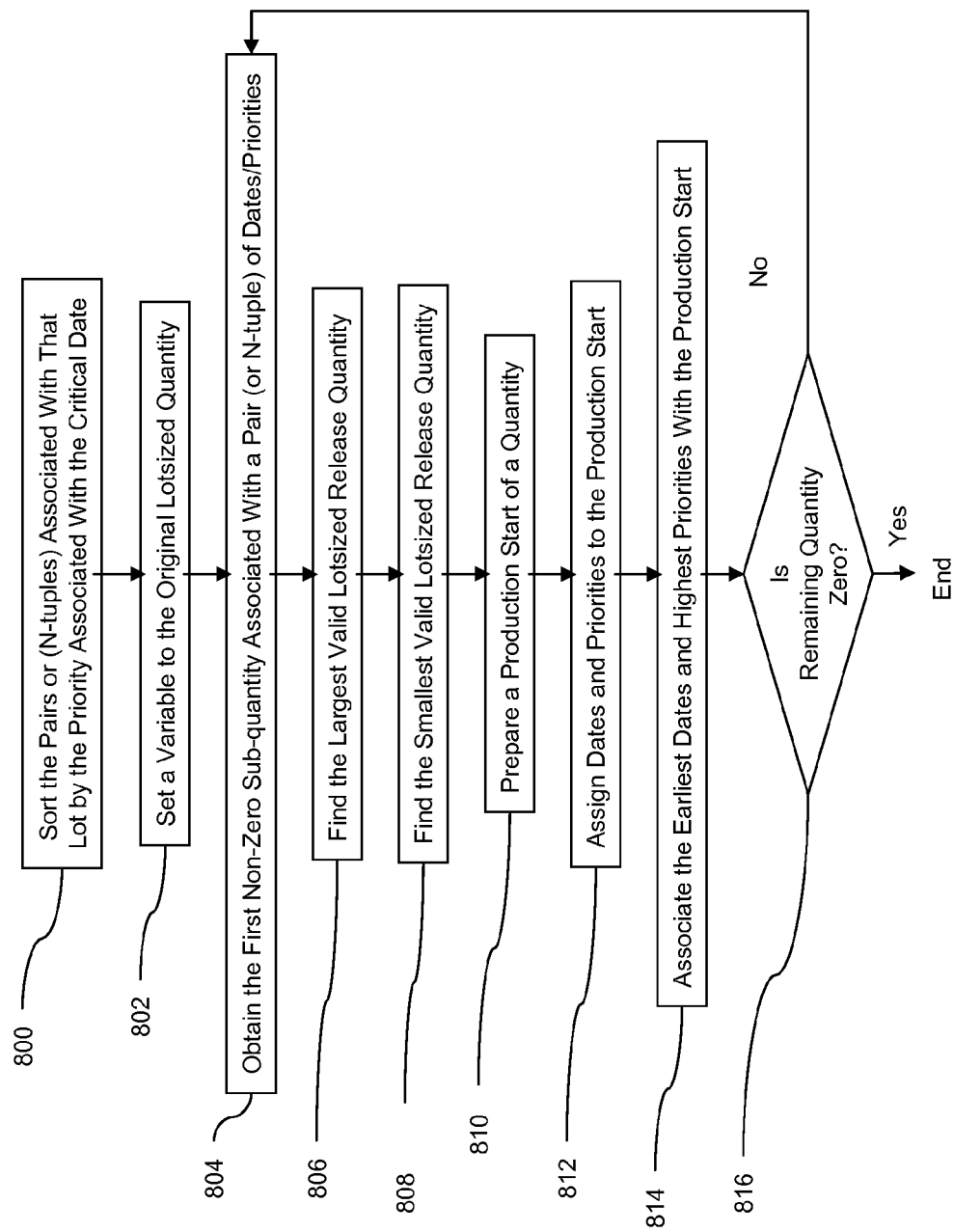
FIG. 7 is a flow diagram illustrates details of associating priorities with a lot when a lot consists of groups of starts each having multiple priorities.

FIG. 7 illustrates one example of how the invention breaks up the production starts in items 700 and 702. These steps can be done for each production lot. The method assumes that one of the dates and its associated priority will represent the "critical date" for the production start. In general, the critical date for a production start is the date with the highest priority and represents the date that will have greatest impact if production starts cannot be made by that date.

As shown in item 800, for each lot, the method sorts the n-tuples of dates and priorities associated with that lot by the priority associated with the critical date. In item 802, the method creates a variable, which could be called REMAINING_QUANTITY, and initially sets it to the original lotsized quantity. In item 804, the method obtains the first non-zero sub-quantity associated with an n-tuple of dates/priorities associated with the production lot being currently broken up. The method then finds the largest valid lotsized release quantity x>0, such that x<=sub-quantity and (REMAINING_QUANTITY-x) is also a valid lotsized quantity or zero in item 806. If no such x exists from item 806, the method finds the smallest valid lotsized release quantity x>0, such that x>=sub_quantity and (REMAINING_QUAN-TITY-x) is also a valid lotsized quantity or zero in item 808. (Note: such an x must always exist as REMAINING_QUANTITY itself must be a valid lotsized release.)

In item 810, the method prepares a production start of quantity x and sets the REMAINING_QUANTITY to REMAINING_QUANTITY-x. In item 812, the method assigns dates and priorities to this production start by netting quantity x from non-zero sub-quantities associated with the lot. As this netting process proceeds, the method associates with the production start the earliest dates and highest priorities found from the items being netted in item 814. In item 816, if REMAINING_QUANTITY=0, the process ends for this lot. Otherwise, the process is repeated starting at item 804.

The following simplified example illustrates the process for one lot using tables. As before, although the method can accommodate any number of dates, for clarity, the illustration below uses two dates which vary by priority which will be called request date and commit date.

lotsize: min = 25, max = 100, mult = 25: sub-quantities sorted by commit priority as commit date is the driving date in this example.

| Quantity | Available Date | Flag | Sub-quantity | Request Date | Request Priority | Commit Date | Com Priority |
|---|---|---|---|---|---|---|---|
| 100 | 03/01 | Not early | 33 | 02/20 | 5 | 03/01 | 1 |
|  |  |  | 67 | 02/25 | 4 | 03/05 | 2 |

Item 802: Remaining_quantity is set to 100.

Item 804: The sub-quantity of 33 pieces represents the first n-tuple of dates and priorities associated with the lot.

Items 806 and 810: 25 pieces is the largest valid lotsize that <33. Furthermore (remaining_quantity−x)= (100−25)=75 which is a valid lotsized release.

Item 812: The method nets 25 from the remaining quantity and the remaining sub-quantities leaving:

lotsize: min = 25, max = 100, mult = 25: sub-quantities sorted by commit priority as commit date is the driving date in this example.

| Rem Quan-tity | Available Date | Flag | Sub-quan-tity | Request Date | Request Priority | Commit Date | Com Priority |
|---|---|---|---|---|---|---|---|
| 75 | 03/01 | Not early | 8 | 02/20 | 5 | 03/01 | 1 |
|  |  |  | 67 | 02/25 | 4 | 03/05 | 2 |

Current Output of process

| Quan-tity | Available Date | Flag | Sub-quan-tity | Request Date | Request Priority | Commit Date | Com Priority |
|---|---|---|---|---|---|---|---|
| 25 | 03/01 | Not early | 25 | 02/20 | 5 | 03/01 | 1 |

Item 804: The sub-quantity of 8 pieces represents the first non-zero n-tuple of dates and priorities associated with the lot.

Item 806: does not yield an x>0 in this case.

Items 808 and 810: 25 pieces is the smallest valid lotsize that is >=8. Furthermore (remaining_quantity−x)= (75−25)=50 which is a valid lotsized release.

Item 812: The method nets 25 from the remaining quantity and the remaining sub-quantities leaving:

lotsize: min = 25, max = 100, mult = 25: sub-quantities sorted by commit priority as commit date is the driving date in this example.

| Rem Quan-tity | Available Date | Flag | Sub-quan-tity | Request Date | Request Priority | Commit Date | Com Priority |
|---|---|---|---|---|---|---|---|
| 50 | 03/01 | Not early | 0 | 02/20 | 5 | 03/01 | 1 |
|  |  |  | 50 | 02/25 | 4 | 03/05 | 2 |

Current Output of process. Note the method netted from each of the sub-quantity entries in the table above. Request priority = 4 was the highest priority request date found among the entries netted and is associated with the start. Similarly, for the other date and priority fields the earliest dates and highest priorities found while netting were associated with the release.

| Quan-tity | Available Date | Flag | Sub-quan-tity | Request Date | Request Priority | Commit Date | Com Priority |
|---|---|---|---|---|---|---|---|
| 25 | 03/01 | Not early | 25 | 02/20 | 5 | 03/01 | 1 |
| 25 | 03/01 | Not early | 25 | 02/20 | 4 | 03/01 | 1 |

Items 804: The sub-quantity of 50 pieces represents the first non-zero n-tuple of dates and priorities associated with the lot.

Items 806: 50 pieces is the largest valid lotsize <=50.

Item 808: Does not apply.

Items 810 and 812: The method nets 50 from the remaining quantity and the remaining sub-quantities leaving:

Step 6: lotsize: min = 25, max = 100, mult = 25: sub-quantities sorted by commit priority as commit date is the driving date in this example.

| Rem Quan-tity | Available Date | Flag | Sub-quan-tity | Request Date | Request Priority | Commit Date | Com Priority |
|---|---|---|---|---|---|---|---|
| 0 | 03/01 | Not early | 0 | 02/20 | 5 | 03/01 | 1 |
|  |  |  | 0 | 02/25 | 4 | 03/05 | 2 |

Step 6: Current Output of process. Date and priority information taken from the only sub-quantity entry which was netted in this iteration.

| Quan-tity | Available Date | Flag | Sub-quan-tity | Request Date | Request Priority | Commit Date | Com Priority |
|---|---|---|---|---|---|---|---|
| 25 | 03/01 | Not early | 25 | 02/20 | 5 | 03/01 | 1 |
| 25 | 03/01 | Not early | 25 | 02/20 | 4 | 03/01 | 1 |
| 50 | 03/01 | Not early | 50 | 02/25 | 4 | 03/05 | 2 |

As remaining quantity is zero at this point, the process ends.

At this point, each row in the table represents a single valid lotsized release quantity associated with a single n-tuple of dates and priorities. Previous non-lotsized sub-quantities have been eliminated by the above processing (items 300 and 302).

Figure 8:
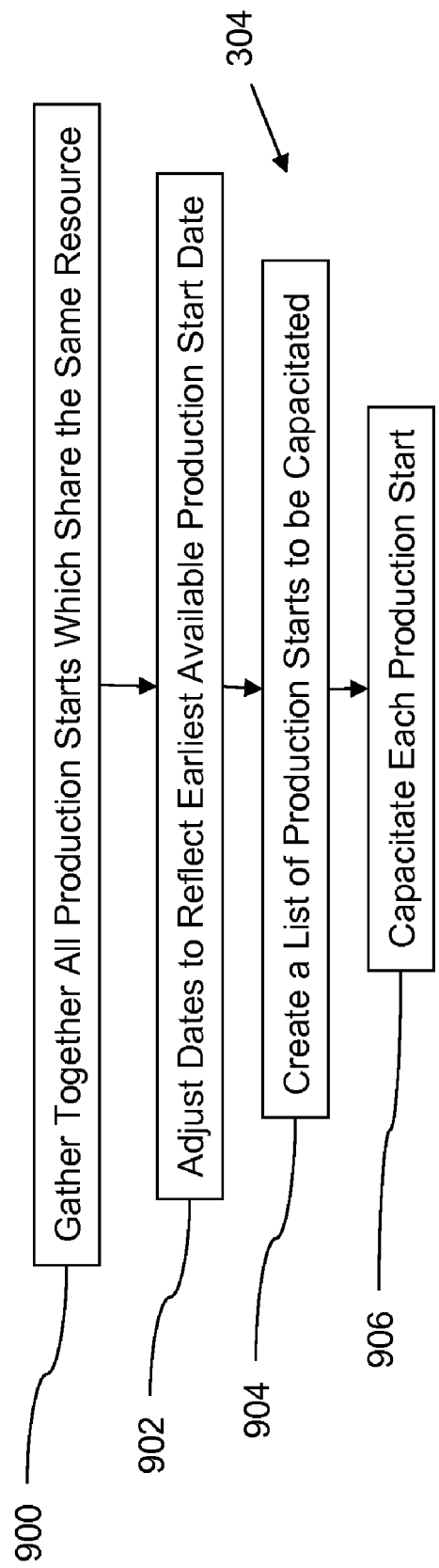
FIG. 8 is a flow diagram illustrating a method of resource allocation handling priorities which vary by date

FIG. 8 illustrates the processing in item 304 in greater detail. As shown above with respect to FIGS. 3-7 above, the method creates valid lotsized production starts and associates each such start with multiple priorities which vary by start date. While the processing represents a method of associating multiple priorities to lotsized releases which vary by date the processing flow in FIG. 8 is not dependent on this particular methodology. Step 900 starts with an input of lotsized releases associated with priorities which vary by date and operates appropriately independently of the method used to create such input.

Essentially, the operations shown in FIG. 8 adjust the production starts in terms of quantity and start date so that the production starts are capacity feasible. The capacitation method has the capability to perform its processing consistent with the multiple priorities by start date which have been associated with the production starts and its results conform to lotsizing rules.

All production starts from step 302 above, which share a same resource, are gathered together and processed together by the method as shown in item 900. By example, U.S. Pat. No. 6,584,370 "Method of calculating low level codes for considering capacities" which was co-invented by the author of this disclosure and is fully incorporated herein by reference, demonstrates a method for determining which item numbers are to be processed together because of shared capacity resources. This invention, however, is not dependent on any specific algorithm which is used to partition production starts sharing the same resources together.

In item 902, the earliest available production start date is determined. If the do not start early flag previously discussed in the detailed description indicates that the production start cannot be made early, an availability date is associated with the lot's recommended start date and the capacitation process cannot release a start earlier in time than this availability date. If the lot is not flagged as being prevented from being started early, the method sets the availability date to the earliest date for which it is permissible to make a capacitated start corresponding to this start. In this case, the availability date may be the first day of the plan or may be later in time if it is desirable to constrain the method from making production starts too early in resolving capacity problems. In any case, the method will adjust the dates associated with the priorities associated with the lots to ensure none of these dates are earlier in time than the lot's given availability date. The method proceeds by examining each of the dates associated with priorities for a given lot. If any one of these dates is earlier in time than the availability date, the date being examined is changed to the availability date. Thus, at the end of this process, none of the dates associated with the multiple priorities of the lots will be less than the availability date.

Item 902 is illustrated by continuing with the previous example in which lots were each associated with 2 priorities called request date and commit_date. The following would be input to item 902.

| Lots entering item 902 with availability date information and multiple priorities associated with multiple dates | | | | | | | |
|---|---|---|---|---|---|---|---|
| Quan-tity | Availabil-ity Date | Flag | Sub-quan-tity | Request Date | Request Priority | Commit Date | Com Priority |
| 25 | 03/01 | Not early | 25 | 02/20 | 5 | 03/01 | 1 |
| 25 | 03/01 | Not early | 25 | 02/20 | 4 | 03/01 | 1 |
| 50 | 03/01 | Not early | 50 | 02/25 | 4 | 03/05 | 2 |

As each of the three lots in the above table are flagged as not being able to start early, the method adjusts the dates associated with the multiple priorities for each lot so that none are less than the availability date. This results in:

| Lots exiting item 902 with availability date information and multiple priorities associated with multiple dates | | | | | | | |
|---|---|---|---|---|---|---|---|
| Quan-tity | Availabil-ity Date | Flag | Sub-quan-tity | Request Date | Request Priority | Commit Date | Com Priority |
| 25 | 03/01 | Not early | 25 | 03/01 | 5 | 03/01 | 1 |
| 25 | 03/01 | Not early | 25 | 03/01 | 4 | 03/01 | 1 |
| 50 | 03/01 | Not early | 50 | 03/01 | 4 | 03/05 | 2 |

In item 904, the method creates a list of production starts to be capacitated, each containing one priority and one associated "required" date. One record containing multiple priorities and dates exiting from step 902 may become multiple records each with one date and priority by the method of item 904. The method proceeds by examining each lot from item 902. For each unique date associated with a priority for a lot, the method will create a lot with one "required date" and one priority where the priority corresponds to the date from the original lot. In the case where the original lot has multiple entries for the same date, the lot created by this record for the corresponding date will contain the highest priority associated with that date in the original lot. In addition, the method of item 904 creates a link between multiple records associated with an original single lot so that future processes in the method can know when multiple entries refer to the same lot and should not be assigned duplicate capacitated production starts. Finally, the method in item 904 sorts the above created records by priority/required date.

The following illustrates item 904 with a simple case continuing the previous example wherein the following lots would be input into item 904.

| Lots exiting item 902 with availability date information and multiple priorities associated with multiple dates | | | | | | | |
|---|---|---|---|---|---|---|---|
| Quan-tity | Availabil-ity Date | Flag | Sub-quan-tity | Request Date | Request Priority | Commit Date | Com Priority |
| 25 | 03/01 | Not early | 25 | 03/01 | 5 | 03/01 | 1 |
| 25 | 03/01 | Not early | 25 | 03/01 | 4 | 03/01 | 1 |
| 50 | 03/01 | Not early | 50 | 03/01 | 4 | 03/05 | 2 |

As explained in the description of item 904, the above information will be transformed into records having one date and priority and linkages to identify which records originated from a single original lot. Each input lot will convert to one or more entries depending on how many unique dates are associated with its priorities. In this case, as only the last lot is associated with multiple dates, only it will be associated with multiple entries. In the example below, identification of output originating from the same original lot is identified by having the same lot ID but the method accepts any method chosen that identifies multiple records originating from the same lot.

| Quantity | Availability Date | Required Date | Priority | Lot ID |
|---|---|---|---|---|
| 25 | 03/01 | 03/01 | 1 | 1 |
| 25 | 03/01 | 03/01 | 1 | 2 |
| 50 | 03/01 | 03/01 | 4 | 3 |
| 50 | 03/01 | 03/05 | 2 | 3 |

Finally the method of 904 would sort the records of our example by priority/date which would output the following in this case:

| Quantity | Availability Date | Required Date | Priority | Lot ID |
|---|---|---|---|---|
| 25 | 03/01 | 03/01 | 1 | 1 |
| 25 | 03/01 | 03/01 | 1 | 2 |
| 50 | 03/01 | 03/05 | 2 | 3 |
| 50 | 03/01 | 03/01 | 4 | 3 |

Figure 9:
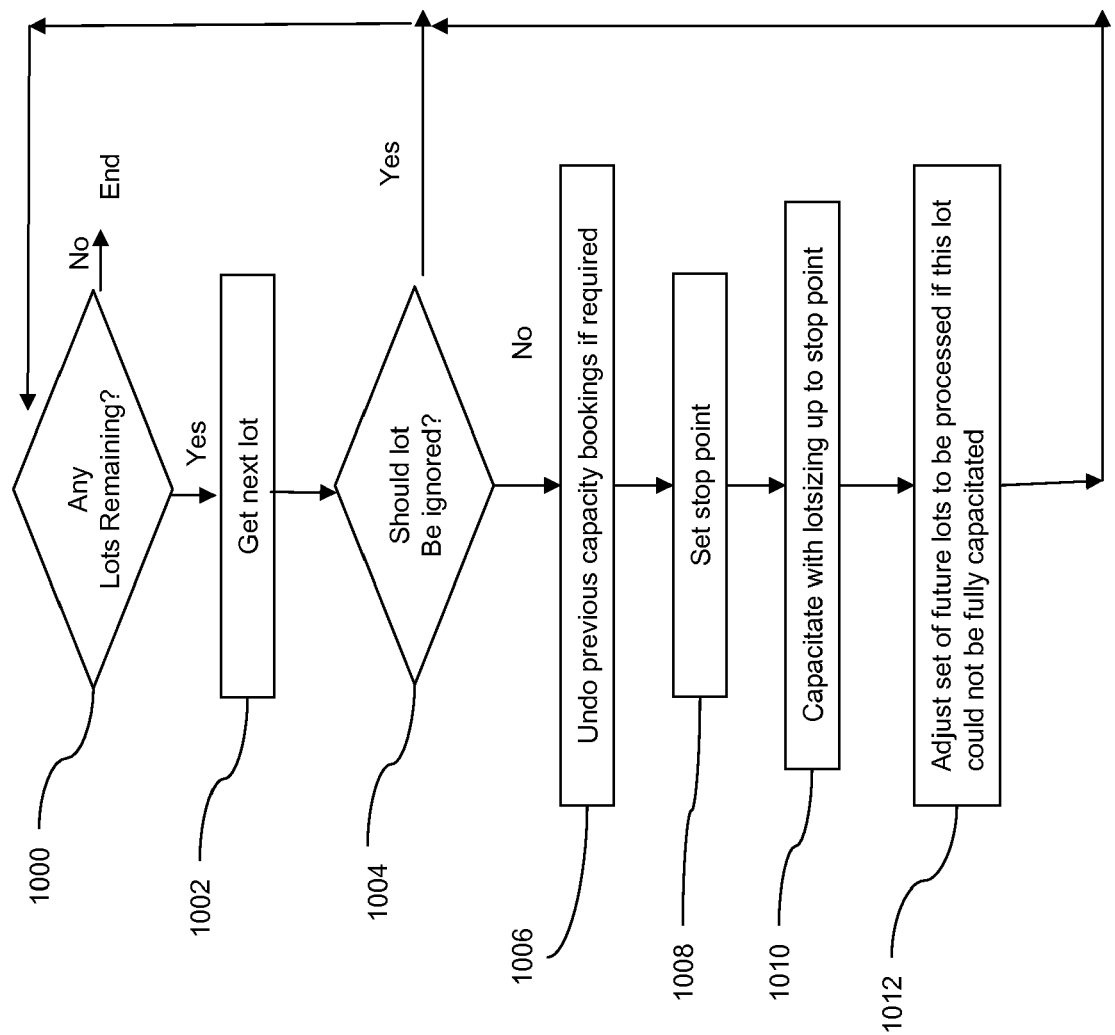
FIG. 9 is a flow diagram illustrating a specific detail of FIG. 8 relating to resource allocation.

Next in item 906, the method capacitates each production start in the order created by item 904. The processing occurring in item 906 is shown in greater detail in FIG. 9. More specifically, in item 1000, the method determines if there are any remaining lots to capacitate. If the answer is no, the method ends. Otherwise, the method proceeds to item 1002.

In item 1002, the method acquires the next lot from the sorted list created by item 904 that has yet to be capacitated.

In item 1004, the method determines whether this lot needs to be processed for capacitation. The same lot may have already been previously processed under a higher priority. The method thus proceeds to search if the given lot has already been capacitated earlier by the process. If there exists a case where the lot has already been capacitated and it was capacitated in response to a required date that is less than or equal to the present required date to be processed then the present record is ignored. Furthermore, the present record is deleted and cannot be further referenced as a linked lot and the method returns to step 1000. If corresponding to the present record, there either exists no previous processing of the lot or previous processing was done for a required date greater than the required date of the present record processing proceeds on to item 1006 described below.

In item 1006, the method first determines if it has to undo any previous capacition bookings that were associated with the lot if it was previously processed. If the method determines this same lot was previously capacitated by the method under a higher priority with a later required date, the method undoes the capacity that was previously booked for the lot. That is, it deletes any calculated capacitated lotsized releases previously calculated for the lot and frees up corresponding capacity consumption. This is done in order to prevent double booking of capacity and manufacturing starts for the same required lot quantity. Note that if the method undid capacity at this point, it unbooked capacity that was available to the lot corresponding to a required date later in time and higher priority than the present record being processed. Therefore, although the method attempts to capacitate the lot earlier in time corresponding to a lower priority, the resulting booking of capacity can do no worse than the original booking. That is, in the worse case, the capacity that was just unbooked can be used to satisfy the present iteration of the lot. This method thus ensures that any attempt to satisfy the lot at an earlier point in time corresponding to a lesser priority cannot adversely impact the booking of the capacity possible to meet more important priorities processed earlier. The method next proceeds to item 1008.

In item 1008, the method sets a "stop point" which represents a date where capacitation will cease for this iteration if the lot being processed has not been totally capacitated by this date. The intent is, if a lot cannot be made to fit into the manufacturing schedule by a certain point in time, the priority for capacitating the lot may be lower. The "stop point" is thus a date wherein capacitation must proceed at a lower priority. To determine the stop point, the method examines future records to be processed to determine if there exist any more required dates associated with the lot having required dates later than the present required date being processed. If one or more such records exist, the method sets the stop date to be the earliest of these dates. If no such record existed, the method sets the stop date to a date indicated as default by the user as a date past which capacitation should no longer occur. The method then proceeds to the main capacitation step in item 1010.

Figure 10:
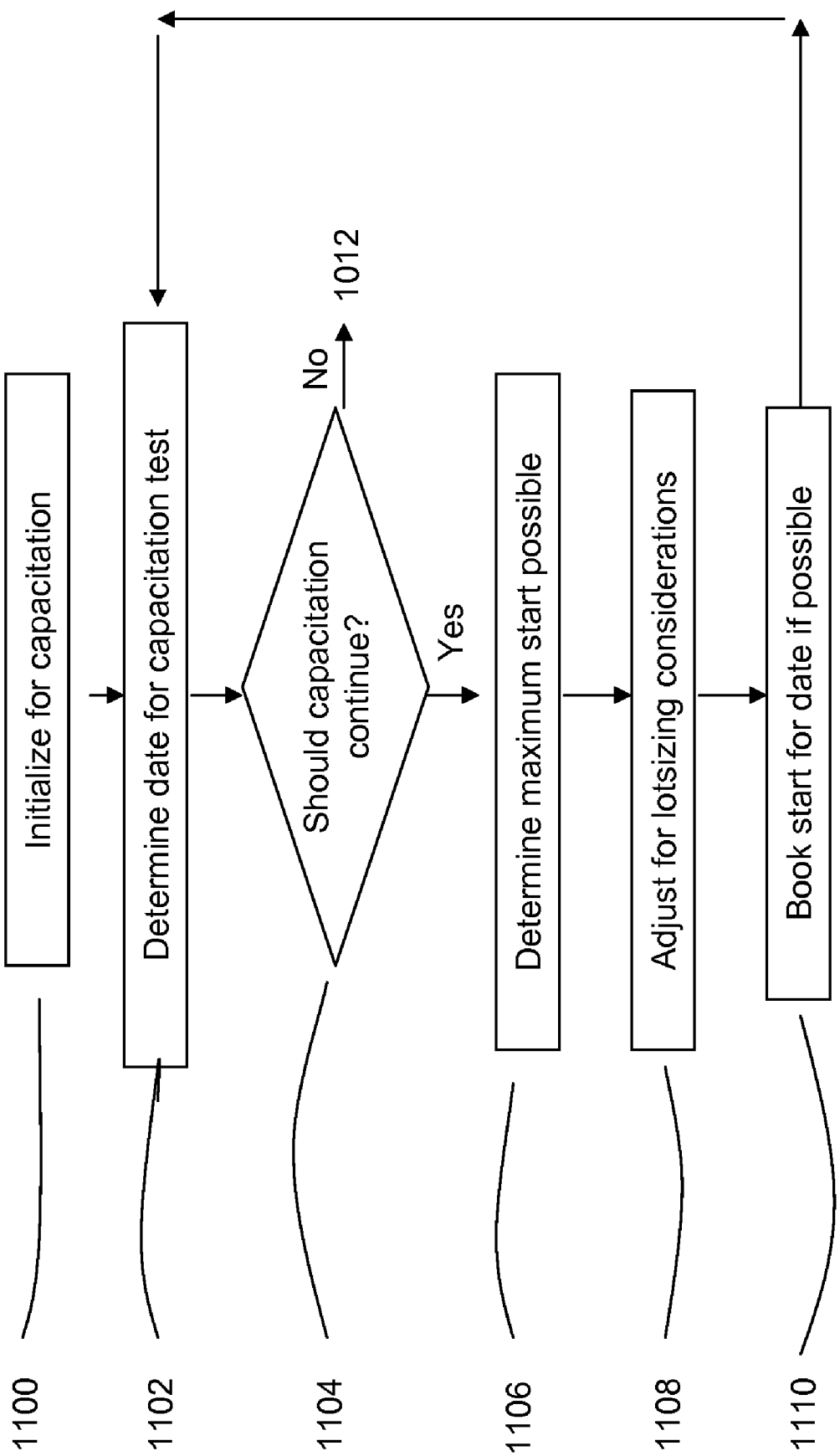
FIG. 10 is a flow diagram illustrating a further detail of FIG. 9 relating to a method of finding available resource.

In item 1010, the lot is capacitated. Put more generally, the lot is potentially split into other valid lotsized releases and scheduled on day or over a period of days such that it does not consume more capacity resources than are available. In the case of manufacturing starts, a given lot may be broken up into separate manufacturing releases on multiple days and the sum of these manufacturing releases would produce product equivalent in quantity to the original lot. Therefore, the output of this step is a list of manufacturing releases having valid lotsizes the totality of which does not exceed available capacity. Please note that this step, as is all others, is extendable to the realm of providing services. In this realm, a lot would correspond to a packaged service and the resulting manufacturing releases would correspond to the scheduling of individual work necessary to perform the service. Lotsizing in the service world would correspond to activity where there may be minimum billing time. FIG. 10 illustrates the capacitation step in further detail and will be described below.

At the end of step 1010, the method proceeds to step 1012. At this point, one of two states will have been reached. In the first state, all of the lot will have been capacitated and converted to manufacturing releases. In this case the method proceeds to item 1000 to determine if there are additional lots to be processed. In the second state, all or part of the lot will not have been capacitated because the "stop point" set in item 1006 will have been reached before all the lot could be capacitated. There will be quantities x>=0 and y>0 such that x+y=the original lot record quantity where x will be the amount that was successfully capacitated and y will be the amount that could not be capacitated. The method proceeds to break up the lot being processed to appropriately deal with the portion that could be capacitated and the portion that could not be capacitated. First the method changes all entries currently linked to this lot to have a quantity of x. By this action and the processing in item 1004, the method will not later process any lower priorities against this portion of the lot if the required dates of those lower priority lots are greater than the present required date being processed. For the y portion of the lot, the method in some cases will be required to process lower priority required dates of the lot where the required dates are later than the required date presently being processed. The method creates dummy lots to force this action as follows. The method creates a dummy lot ID that is unique. For each lot entry corresponding to the present lot which is yet to be processed by the method, the invention creates a new corresponding record with matching date and priority but with quantity y and associates it with the dummy lot ID generated. Hence the method creates a linked set of dummy lots corresponding to the y quantity that were not capacitated during this step for future processing by the method. Additionally, if in step 1006 of the method, capacity was undone, the method creates an additional dummy record of quantity y with the dummy lot ID corresponding to the later required date and high priority of the record whose capacity was undone in step 1006 and links it with the other dummy lots created. By doing this last step, the method ensures that capacitation previously done to satisfy the higher priority need will not be lost and will be handled; the next iteration of step 1000 will create starts needed to support the higher priority date. The method then adds these new records to lots read by step 1000 and sorts the records appropriately to ensure the records to be processed maintain priority/date order. During this sort/merge process, the method also deletes any records found with quantity zero which may have resulted if x was 0. Next the method proceeds to step 1000.

FIG. 10 illustrates item 1010 in greater detail. At the start of 1100, a lot for a specific date, quantity and priority is ready to be capacitated. The method initializes variables "current_lot quantity" to the quantity associated with the lot, "current date" to the required date of the lot and "try earlier" to true. The method also holds the availability date associated with the lot.

In item 1102, the method determines the date for which a capacitation test is to be done. This corresponds to the "current date" referred to in the description of item 1100. If this is the first time this step of the method has been entered for the lot/required date being processed, the method goes immediately to item 1104. Otherwise, if "try earlier" is set to true, the method determines if the present current_date is less than or equal to availability date. If so, the method sets "try earlier" to false, sets current_date to the original required date of the lot plus one day and goes to item 1104. Otherwise, the method subtracts one day from current_date and goes on to item 1104. Otherwise, "try earlier" was originally set to false so one day is added to current_date and the method proceeds to item 1104. By performing the above, if the method cannot capacitate the lot fully on the required date, the method next attempts to find capacity to do a manufacturing start by starting early if possible. If this is not possible, it looks for capacity later than the required date.

In item 1104, the method determines whether it must continue to attempt to capacitate the current_lot_quantity. The method ends at this point and returns to item 1012 if "current_lot_quantity" is zero or "current date" is greater than or equal to stop date. Otherwise the method goes on to item 1106.

In item 1106, the method uses any capacitation method appropriate to determine the "possible capacitated starts" corresponding to the maximum amount of current_lot_quantity that can be built on current_date without exceeding available capacity. The method proceeds to item 1108.

In item 1108, the method performs calculations that must be done if the lot must be lotsized. If the lot being processed is a lotsized lot, the method finds the largest possible start x that can be made that is a valid lotsize which is <="possible capacitated starts" such that (current lot quantity–x) is also a valid lotsized start or zero. If the current start does not require lotsizing, the method sets x=the "possible capacitated starts" returned from the capacitation method.

In item 1110, manufacturing starts are created and available capacity resources are appropriately decremented if it is possible to make a valid manufacturing start on the current_date. If x is greater than zero, the method creates a manufacturing release of quantity x for date current_date and links it with the lot/required date being processed. This linkage will be used in item 1006 of the method to undo capacitation and booked starts when needed. The method decrements available capacity as required by the manufacturing release that was created in this step. Finally, the method subtracts x from "current_lot_quantity". The method then proceeds to item 1102.

The details of the general method thus explained, its utility to specific business problems is easily seen. For example, a business with long lead time products may wish to make manufacturing starts to meet a customer's desired (or request)_date but not at the expense of missing the customer's (or another customer's) commit_date. In this case, two dates would be associated with manufacturing starts, one corresponding to the earlier in time customer request date with lower priority and another corresponding to a later customer commit date with higher priority. The method, as demonstrated, would perform resource allocations (capacitation) in a manner to best preserve customer commit date while attempting to better to customer request date. The method accomplishes this by first capacitating production starts to the higher priority commit date. The corresponding lower priority request date is processed subsequently and before it is processed, the production starts and capacity consumed by the corresponding higher priority commit_date is undone by item 1006, above. When capacitation for the request date is performed, it is then possible that capacitated production starts can be made earlier in time in response to the request_date if available capacity exists. In no case will production starts be later in time than that originally assigned to the higher priority commit date as the method will, in the worst case, be able to create production starts using the capacity made available when the resources associated with the higher priority start were returned to the method in item 1006. Therefore, the method supports the business goal of allowing production starts to be made to support request date provided higher priority commit dates are not impacted.

As a further example of the utility of the method in practice, take a case where a business can be awarded bonus money for delivering product by a certain date. In this case, the business would want to drive production starts early to a high priority but if a capacitated start could not be made before a date guaranteeing delivery by the bonus date, the business would want to reduce the priority of the start to be consistent with other production starts. The method supports this by allowing a start to be associated with an initial higher priority and with a later date with a lower priority indicating it is beyond the point when the bonus date can be met. The method will first attempt to create capacitated releases to the earlier higher priority date but by the actions of items 1108 and 1110 where "stop date" is employed, if manufacturing releases cannot be done by the second date, capacitation at that point will be done at lower priority when competing for available resources.

An embodiment of the present invention has been programmed in C++ and implemented on an IBM P690 server with AFS for data storage and using the AIX operating system. It has also been implemented on HP-UX. It should be understood by those of ordinary skill in the art, however, that the present invention is not limited to the above implementation and is independent of the computer/system architecture. Accordingly, the present invention may equally be implemented on other computing platforms, programming languages, and operating systems, and also may be hard-wired into a circuit or other computational component.

Figure 11:
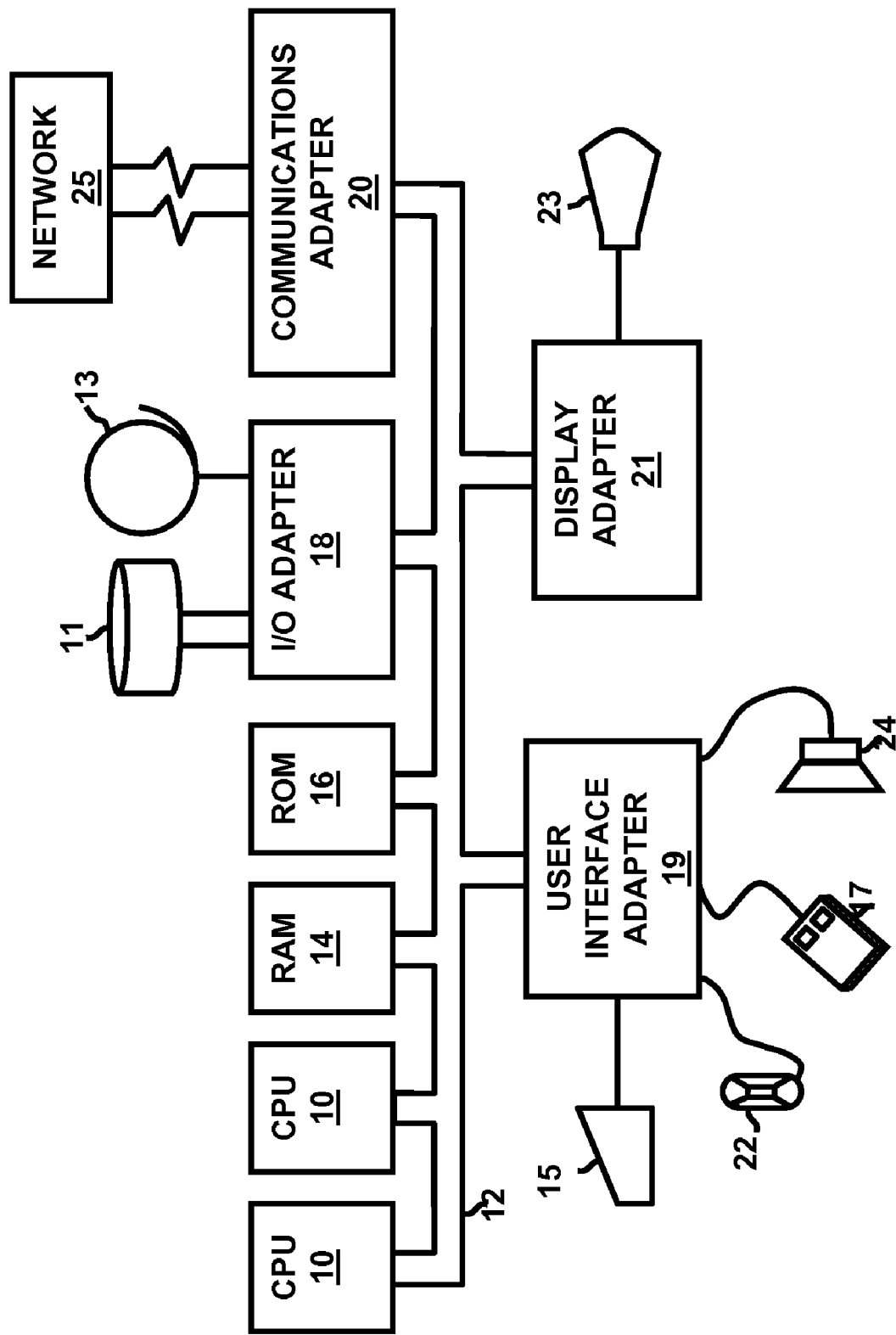
FIG. 11 is a schematic diagram of a computer system according to one embodiment of the invention.

A representative hardware environment for practicing the embodiments of the invention is depicted in FIG. 11. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

While the invention has been described in terms of the preferred embodiments, those skilled in the art will recognize that the invention can be practiced with modification within the spirit and scope of the appended claims.

The invention claimed is:

1. A method of determining production starts in a manufacturing environment, said method comprising:

inputting production starts;

grouping said production starts into production lots according to grouping rules;

assigning start dates and associated priorities to each of said production lots such that a plurality of start dates is associated with at least one production lot, wherein each start date of a production lot has a different priority;

sorting said production lots according to said associated priorities and said start dates; and iterating through said production lots to assign production capacity to said production lots in order of said associated priorities and said start dates, wherein said iterating through said production lots begins with a production lot having a highest priority production start date and ends with a production lot having a lowest priority production start date.

2. The method according to claim 1, wherein said iterating considers links to higher and lower priority start dates of each of said production lots.

3. The method according to claim 1, wherein valid production lots comply with said grouping rules.

4. The method according to claim 1, further comprising splitting said production lots into multiple valid lotsized production lots.

* * * * *